United States Patent
Aseev

(10) Patent No.: US 11,182,403 B2
(45) Date of Patent: Nov. 23, 2021

(54) SYSTEMS AND METHODS OF LAUNCHING NEW NODES IN A BLOCKCHAIN NETWORK

(71) Applicant: CHAINSTACK PTE. LTD., Singapore (SG)

(72) Inventor: Evgeny Aseev, Singapore (SG)

(73) Assignee: CHAINSTACK PTE. LTD., Singapore (SG)

( * ) Notice: Subject to any disclaimer, the term of this patent is extended or adjusted under 35 U.S.C. 154(b) by 72 days.

(21) Appl. No.: 16/866,620

(22) Filed: May 5, 2020

(65) Prior Publication Data

US 2020/0372043 A1 Nov. 26, 2020

Related U.S. Application Data

(60) Provisional application No. 62/851,257, filed on May 22, 2019.

(51) Int. Cl.
| | |
|---|---|
| *G06F 16/27* | (2019.01) |
| *G06F 16/22* | (2019.01) |
| *G06F 21/62* | (2013.01) |
| *G06F 16/23* | (2019.01) |

(52) U.S. Cl.
CPC .......... *G06F 16/27* (2019.01); *G06F 16/2255* (2019.01); *G06F 16/2379* (2019.01); *G06F 21/6218* (2013.01)

(58) Field of Classification Search
CPC .... G06F 16/128; G06F 16/27; G06F 16/2255; G06F 16/22; G06F 16/2365; G06F 16/275; G06F 2201/84; G06F 3/067; H04L 67/1097; H04L 2209/38

See application file for complete search history.

(56) References Cited

U.S. PATENT DOCUMENTS

| | | | |
|---|---|---|---|
| 11,100,502 B1 * | 8/2021 | Rainey | H04L 9/3236 |
| 2018/0322161 A1 * | 11/2018 | Horii | G06F 16/2358 |
| 2019/0155513 A1 * | 5/2019 | Maeda | G06F 16/2322 |
| 2020/0242592 A1 * | 7/2020 | Scrivner | H04L 9/0637 |
| 2021/0049156 A1 * | 2/2021 | Lu | G06F 3/061 |
| 2021/0216534 A1 * | 7/2021 | Li | G06F 16/2379 |

* cited by examiner

*Primary Examiner* — Robert W Beausoliel, Jr.
*Assistant Examiner* — Pedro J Santos
(74) *Attorney, Agent, or Firm* — Arent Fox LLP; Michael Fainberg

(57) ABSTRACT

Disclosed herein are systems and method for launching a new node in a blockchain network. In one exemplary aspect, the method may generate a snapshot of a node participating in a blockchain network and storing the snapshot in an archive, wherein the snapshot comprises a blockchain. The method may receive a request to create a new node to participate in the blockchain network. The method may retrieve, from the archive, the snapshot of the node in the blockchain network. The method may create the new node and load the snapshot onto the new node such that the blockchain comprised in the snapshot is imported without downloading or verifying the blocks of the blockchain individually. The method may then synchronize the new node with changes that occurred on the blockchain subsequent to the generation of the snapshot.

17 Claims, 5 Drawing Sheets

SYSTEMS AND METHODS OF LAUNCHING NEW NODES IN A BLOCKCHAIN NETWORK

CROSS-REFERENCE TO RELATED APPLICATIONS

This application claims the benefit of U.S. Provisional Application No. 62/851,257, filed May 22, 2019, which is herein incorporated by reference.

FIELD OF TECHNOLOGY

The present disclosure relates generally to the field of blockchain networks, and more specifically, to systems and methods of launching new nodes in a blockchain network.

BACKGROUND

Typically, blockchain networks comprise multiple distributed nodes processing transactions and storing the data. The blockchain nodes exchange information in a peer-to-peer manner, which increases the decentralization of a blockchain-based system and eliminates the need for a middleman entity.

Such architecture puts a significant demand on the hardware requirements of each node running as a full blockchain node (i.e., a node that fully verifies all the rules of a network) in large networks. Another effect is that synchronization of the blockchain for new nodes requires a lot of time and is very demanding on storage and network performance.

For example, the volume of data traffic associated with popular blockchain platforms such as Bitcoin can extend to several hundred gigabytes. Even if the network capabilities of a new node are of high performance (e.g., high download/upload speeds), validating each block and the transactions contained within can take several hours to days depending on the hardware capabilities of the new node and complexity of each transaction. If a new node does not have much random access memory (RAM), processing power, and has a slow disk (e.g., the lack of a solid state drive (SSD)), the initial synchronization may be extremely slow. As ledgers are consistently increasing in size (with several hundred thousand blocks in the case of Bitcoin), this issue becomes even more apparent.

SUMMARY

To address these shortcomings, aspects of the disclosure describe methods and systems for launching a new node in a blockchain network.

In one exemplary aspect, the method may generate a snapshot of a node participating in a blockchain network and storing the snapshot in an archive, wherein the snapshot comprises a blockchain. The method may receive a request to create a new node to participate in the blockchain network. The method may retrieve, from the archive, the snapshot of the node in the blockchain network. The method may create the new node and load the snapshot onto the new node such that the blockchain comprised in the snapshot is imported without downloading the blocks individually or verifying the blocks in the blockchain. Because the blocks and transactions of the blockchain may already be verified on the snapshot, no additional verification of the blocks would be necessary. The method may then synchronize the new node with changes that occurred on the blockchain subsequent to the generation of the snapshot.

In some aspects, the method may generate a plurality of snapshots of nodes participating in the blockchain network, wherein each snapshot of the plurality of snapshots is associated with a respective node sync mode. The method may determine a node sync mode of the new node, and select the snapshot for loading onto the new node in response to determining that the respective node sync mode of the snapshot matches the node sync mode of the new node. For example, in response to determining that the node sync mode of the new node is to be an archival sync mode, the method may select a respective snapshot from the plurality of snapshots that is also in archival sync mode. Other examples of sync modes include, but are not limited to fast mode, full mode, and light mode. In fast mode, a node is synchronized by downloading the entire state database, requesting the headers first, and filling in block bodies and receipts afterward. In light mode, a given node stores the header chain and requests everything else on demand. In full mode, the conventional synchronization is performed as discussed previously. In some aspects, synchronization may be performed with or without pruning (i.e., reducing storage requirements by enabling deletion of old blocks). In some aspects, synchronization may be performed with or without maintaining a full transaction index. Given the modes listed above, the method may create a snapshot of each node corresponding to the different modes. When a new node is to be synchronized, the method may determine the mode of the new node and select a snapshot associated with the determined mode for loading (e.g., a new node that is to be a light node will be loaded with a snapshot of a light node).

In some aspects, the blockchain network comprises a private ledger and the snapshot may be considered a first snapshot. The method may determine whether the new node has permission to access the private ledger and in response to determining that the new node has permission to access the private ledger, the method may retrieve a second snapshot of a node on the blockchain network with access to the private ledger. The method may then load the second snapshot onto the new node. In some aspects, the first snapshot comprises data that is public to the network and the second snapshot comprises private data.

In some aspects, the method may generate a respective snapshot for each respective node participating in the blockchain network, wherein the respective snapshot comprises the blockchain. The method may then compare the respective snapshot with each other respective snapshot to determine whether the blockchain on the respective snapshot matches more than a threshold number of blockchains on the other respective snapshots (e.g., whether a majority of the nodes in the blockchain network have the same blockchain). In response to determining that the blockchain on the respective snapshot matches more than the threshold number of the blockchains on the other respective snapshots, the method may select the respective snapshot as the snapshot to load onto the new node. This may be taken as a security measure in case the node that the snapshot was taken from was compromised or is malicious.

In some aspects, the method may determine a first hash value of the snapshot at a time of generating the snapshot and may store the first hash value in the archive. Prior to loading the snapshot onto the new node, the method may determine a second hash value of the snapshot. In response to determining that the first hash value in archive and the second hash value match, the method may load the snapshot onto the new node. In some aspects, the method may select a different snapshot to load onto the new node in response to determining that the first hash value in archive and the second hash value do not match. This may also be taken as a security measure in case the snapshot is altered while stored in the archive by a malicious entity.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product of launching new nodes in blockchain network. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Aspects of the present disclosure provide blockchain nodes as a service. Customers can deploy a new blockchain network or create a node to connect to an existing blockchain network. Any time a user wants to launch a new full node, in previous solutions the user would install node software that syncs with blockchain data from the blockchain network. Instead of launching a new node and letting the node sync from the peer nodes, aspects of the present disclosure include providing the new node with a snapshot with the blockchain data, so the node software only has to sync a small part of the overall blockchain data instead of a costly operation in copying the entire blockchain data. A platform, e.g., a provider of blockchain nodes as a service performs the periodic snapshots so they are available for newly launched nodes.

Using this approach, the time to spawn up a new completely synced node can be shortened from a few days to a few minutes for networks with large blockchain data volume such as public Bitcoin or Ethereum. Snapshots are created in all data centers of cloud providers where aspects of the present disclosure operate. Hence, the user/customer can access a completely synced node regardless of the data center they choose to deploy the node.

Aspects of the present disclosure work for all kinds of blockchain networks regardless of whether they are public, consortium, or private. If a consortium or private network is fully operated by a single operator, all network members will receive completely synced nodes in a significantly shorter time than with previous technologies, because the snapshots for the blockchain data are created from network inception.

Figure 1:
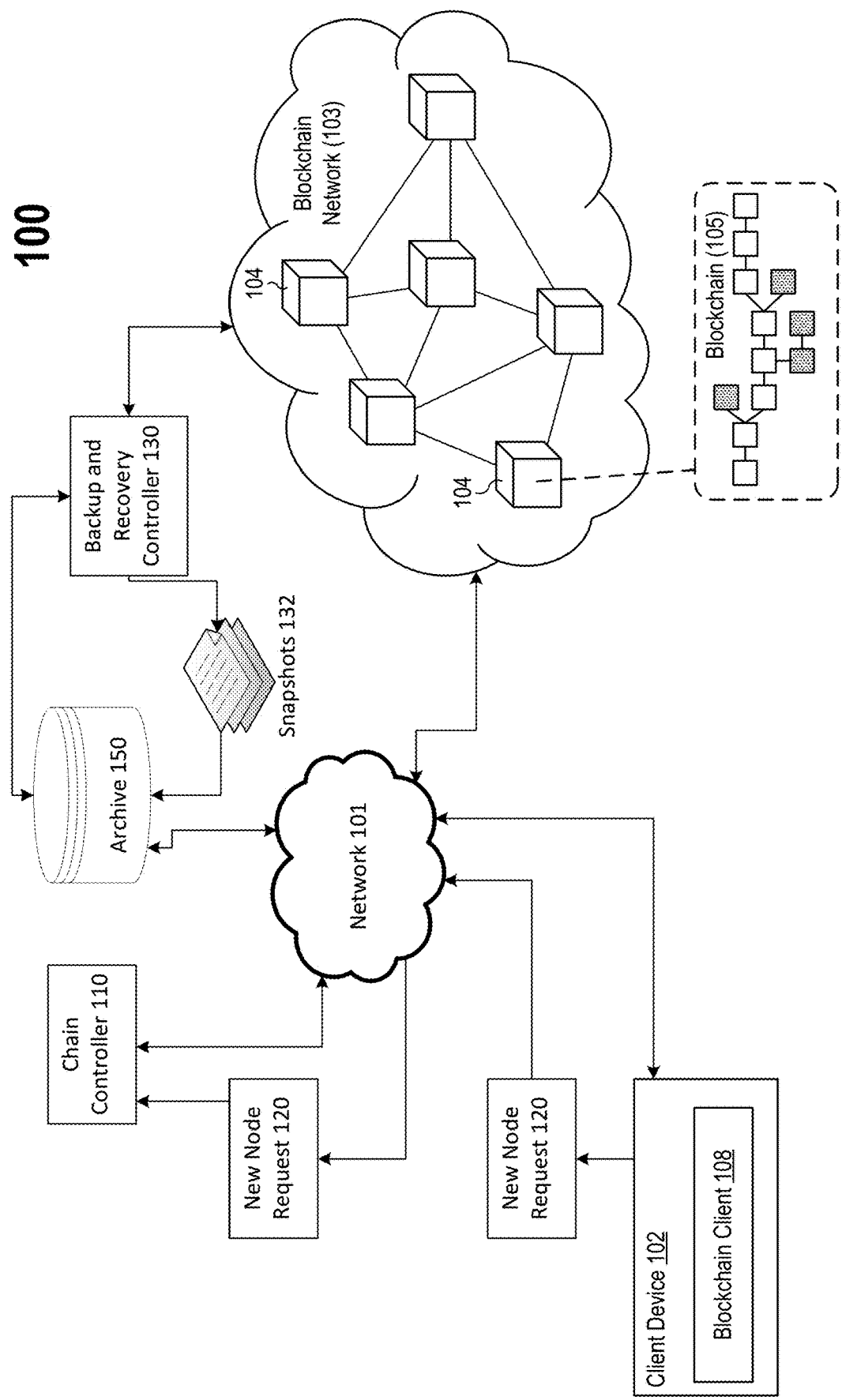
FIG. 1 is a block diagram illustrating a system of launching new nodes in blockchain network, in accordance with exemplary aspects of the present disclosure.

FIG. 1 is a block diagram illustrating a system 100 of launching new nodes in blockchain network, in accordance with exemplary aspects of the present disclosure.

The system 100 comprises a client device 102 communicating with a chain controller 110 that controls operation of one or more nodes in a blockchain network 103 over a network 101. In exemplary aspects, the chain controller 110 controls the adding, removing, configuring and operating of one or more nodes in the blockchain network 103. Chain controller 110 and the nodes of blockchain network 103 may be different electronic devices that are capable of exchanging data over network 101 (e.g., a local area network (LAN) or a wide area network (WAN) such as the Internet). The system 100 further comprises a backup and recovery controller 130 that creates snapshots 132 of the nodes of the blockchain network 103 and stores the snapshots 132 into the archive 150. In some aspects, backup and recovery controller 130 may be a module stored on each node of blockchain network 103 and archive 150 may be a server designated to store snapshots of each node of blockchain network 103. In exemplary aspects, a single chain controller 110 may control operation of a portion of nodes on a plurality of blockchain networks, though only one network is shown for simplicity.

The client device 102 may comprise a blockchain client 108 that requests the creation of a new node for the blockchain network 103 by submitting a new node request 120 to the chain controller 110. The chain controller 110 may forward this request to a blockchain as a service platform providing services for the blockchain network 103 to create a new node based on snapshots 132 from the archive 150, or in some aspects, the chain controller 110 may already be a component of the blockchain as a service platform. In exemplary aspects, the archive 150 may be hosted by a cloud platform that may be used by the blockchain as a service platform for resources such as compute or storage.

The backup and recovery controller 130 periodically creates snapshots 132 of the nodes 104 within the blockchain network 103. In exemplary aspects, the backup and recovery controller 130 is specifically configured to operate with various cloud providers/platforms and may reside on the cloud infrastructure itself. However, it is not necessary that the backup and recovery controller 130 reside on the cloud infrastructure. Generally, each of the nodes in the blockchain network 103 are equivalent to each other, and therefore a snapshot of a single node is sufficient for adding a new node. However, for security purposes, a respective snapshot of each node 104 of blockchain network 103 may be saved in archive 150. Suppose that a snapshot is taken from a node in network 103 and the node is in fact malicious (e.g., is controlled by an entity that is trying to hit blockchain network 103 with a 51% attack). If enough new nodes that share the snapshot with the malicious node are added into network 103 such that the new nodes become a majority of network 103, the entity can execute bad transactions that are approved because a majority of the network 103 agrees with the changes/additions.

To prevent such an attack, backup and recovery controller 130 may compare each of the respective snapshots acquired from the nodes of network 103 at a given time to determine whether the blockchain on a respective snapshot matches more than a threshold number of blockchains on the other respective snapshots (e.g., whether a majority of the nodes in the blockchain network have the same blockchain). In response to determining that the blockchain on the respective snapshot matches more than the threshold number of the blockchains on the other respective snapshots, chain controller 110 may select the respective snapshot as the snapshot to load onto the new node.

In some aspects, a given node 104 of the blockchain network 103 may include multiple ledgers, both public and private. In some aspects, backup and recovery controller 130 acquires snapshots comprising each ledger on the node 104 (e.g., one ledger per snapshot). When a new node is created by the chain controller 110, the new node has a snapshot applied. Subsequently, in some aspects after the new node gains permission to access, for example, a private ledger, snapshots of nodes comprising the private ledger are also applied to the new node, though in other aspects the backup and recovery controller 130 may not perform this additional permission check at all.

In some aspects, subsequent to capturing a snapshot of a node, backup and recovery controller 130 may generate a hash value of the snapshot and store the hash value in archive 150. This hash value may be used for security purposes to ensure that a snapshot being loaded onto a new node has not been tampered with. More specifically, prior to loading a given snapshot onto a new node, chain controller 110 may generate another hash value of the snapshot and compare the another hash value with the original hash value determined during the capturing/generation of the snapshot. If the two hash values match, chain controller 110 may confirm that the snapshot has not been tampered with and thus, can be loaded onto the new node. However, if the hash values do not match, chain controller 110 may select a different snapshot stored in archive 150.

According to an exemplary aspect, the blockchain network 103 can be a distributed peer-to-peer network formed from a plurality of nodes 104 (computing devices) that collectively maintain a distributed ledger, also referred to as a blockchain 105. The blockchain 105 is a continuously-growing list of data records hardened against tampering and revision using cryptography and is composed of data structure blocks that hold the data received from other nodes 104 or other client nodes, including the client device 102 and server systems executing an instance of the blockchain client 108. The blockchain client 108 is configured to transmit data values to the blockchain network 103 as a transaction data structure, and the nodes 104 in the blockchain network records and validates/confirms when and in what sequence the data transactions enter and are logged in the existing blockchain 105.

The transaction data structure may contain computer-executable code, or a reference to computer-executable code stored in an existing blockchain entry, that is executed by a node in the blockchain network as part of the validation procedure. Every node in the decentralized system can have a copy of the growing blockchain 105, avoiding the need to have a centralized ledger managed by a trusted third party. Moreover, each of the nodes can validate the data/transactions, add hash values to their copy of the blockchain 105, and then broadcast these additions to other nodes in accordance with existing blockchain methodologies. In some aspects, the blockchain network 103 may be comprised of a mixture of full nodes and partial nodes (often referred to as light or lightweight nodes). Full nodes may process the full blockchain and are validating and enforcing data integrity of the blockchain on a regular basis. Partial nodes, in contrast, are configured to interact with the blockchain in a lightweight manner, for example, by downloading block headers, and verifying only a small portion of what needs to be verified, using a distributed hash table as a database for the nodes in place of its local hard drive. In one aspect, the blockchain clients 108 may be configured as partial nodes of the blockchain network, while other servers in the system 100 may be configured as full nodes.

After a most recent snapshot is applied to the new node, the node may not yet ready for introduction into the blockchain network 103. There backup and recovery controller 130 performs a determination as to whether there have been updates to the nodes after the creation of the most recent snapshot, because snapshot schedules may not occur often enough. For example, in order to conserve resources at the cloud infrastructure hosting the blockchain network 103 and the archive 150, the snapshots may only be performed every five minutes or according to some other predetermined schedule balanced between data coverage and storage limitations. Thus, the new node must be further updated with whatever transactions have occurred since the snapshot creation. The chain controller 110 retrieves a time of the snapshot creation, and then compares ledgers in a node 104 of the blockchain network. In some aspects, the chain controller 110 applies a filter to the ledger to retrieve only those transactions that occurred after the time of the snapshot creation. The node then automatically syncs the updated transactions, synchronizing the node with the rest of the blockchain network 103.

Figure 2:
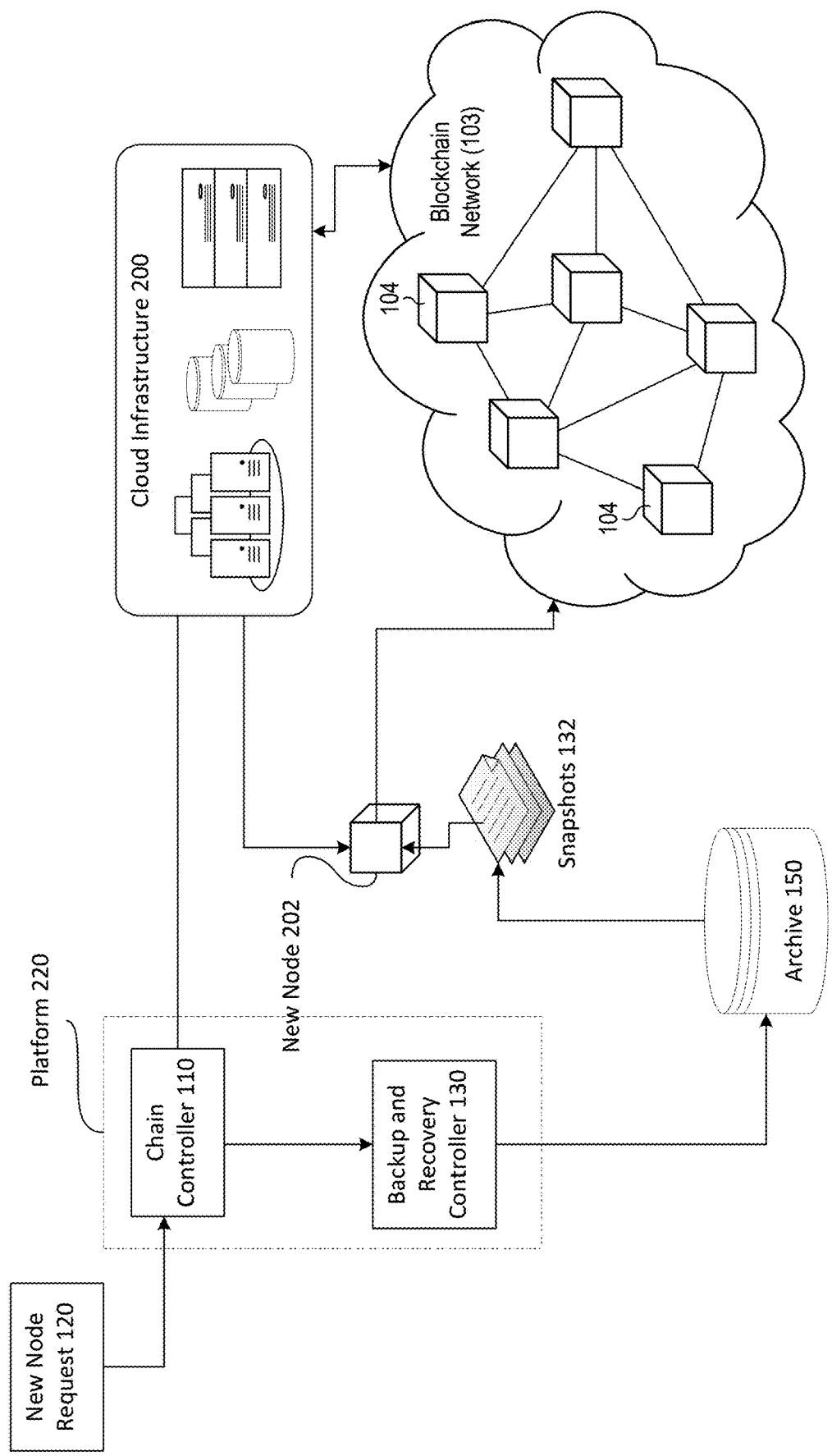
FIG. 2 is a block diagram illustrating operation of the chain controller 110, in accordance with exemplary aspects of the present disclosure.

FIG. 2 is a block diagram illustrating operation of the platform 220 comprises the chain controller 110 and the backup and recovery controller 130, in accordance with exemplary aspects of the present disclosure.

The chain controller 110 receives the new node request 120 for a new node to be created and to join, for example, the blockchain network 103. The request 120 may be received from a user interface (e.g., graphical/browser based or the like) or programmatically through an application programming interface (API) or a software development kit (SDK). The chain controller 110 forwards this request to cloud infrastructure 200 that creates a new node 202. In exemplary aspects, the cloud infrastructure 200 is not platform specific and may be any type of cloud platform capable of supporting a blockchain network such as Azure®, Google Cloud®, AWS® or the like. Subsequently, the chain controller 110 issues a request to the backup and recovery controller 130 to apply a snapshot from snapshots 132 to the new node. In other words, in order to quickly and effectively create a new node in the blockchain network 103, an existing node's snapshot is applied to quickly update the new node. In some aspects, the snapshots 132 may include a snapshot of a single node in the blockchain network 103 for each cloud and region. In exemplary aspects, the snapshot that is applied is a most recently taken snapshot of any node within the blockchain network 103. In further aspects, only a snapshot of a node associated with public ledgers on the blockchain network 103 are applied to the new node, until the new node 202 obtains permission to access the private ledgers. In other aspects, the chain controller 110 and the backup and recovery controller 130 may be a part of the blockchain platform 220, though the present disclosure does not limit the configuration thereto.

Figure 3:
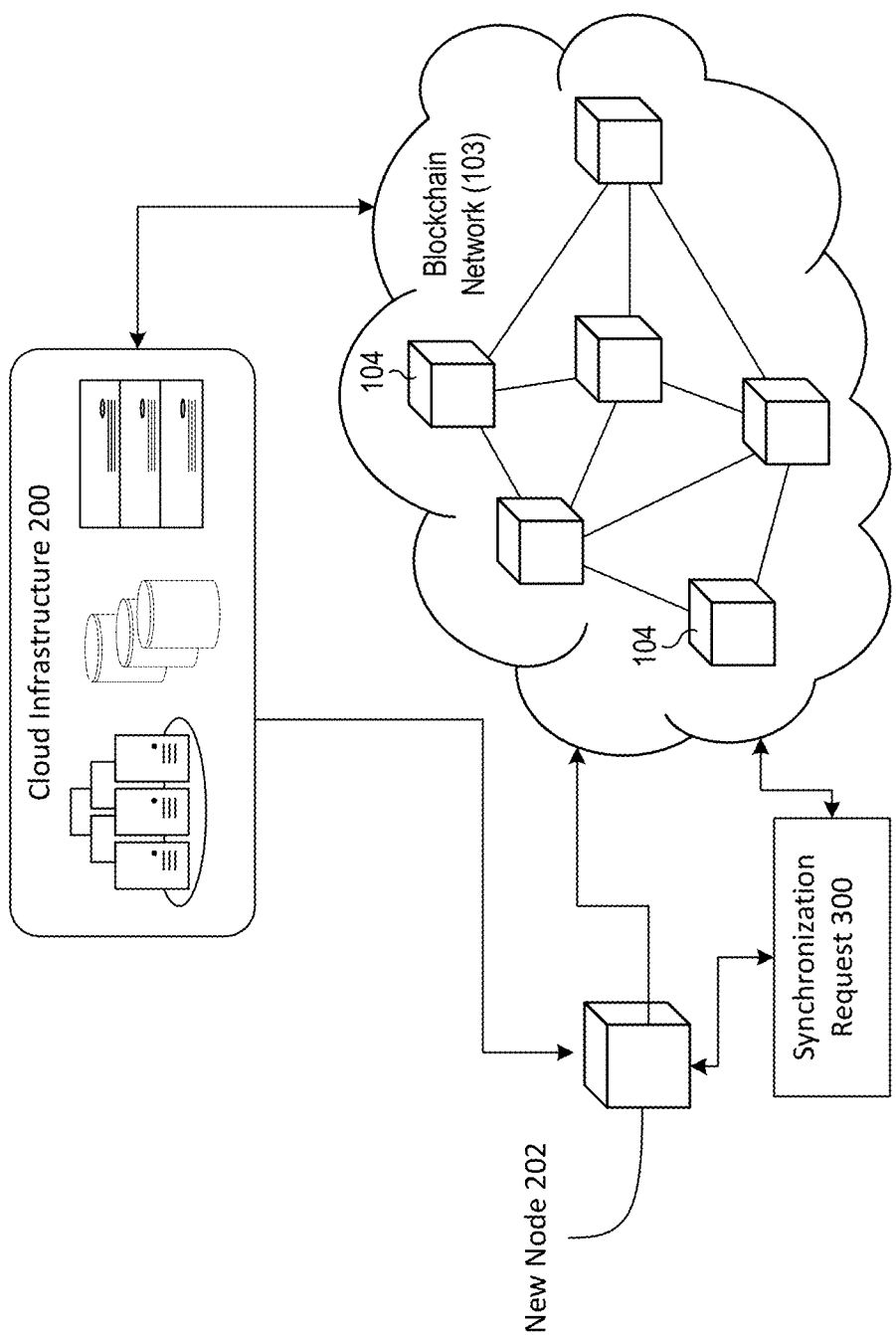
FIG. 3 is a block diagram illustrating another operation of the chain controller 110, in accordance with exemplary aspects of the present disclosure.

FIG. 3 illustrates the launching of the new node 202 with the blockchain network 103, in accordance with exemplary aspects of the present disclosure.

By the time the new node 202 is created and added to the network 103, it is possible that the blockchain network 103 contains transactions that are created after the snapshot was created by the backup and recovery controller 130. Thus, once the new node 202 is created, added to the network 103 and running, the new node 202 performs a self-update to synchronize itself with the other nodes in the network 103. In exemplary aspects, this self-update occurs automatically using software built into the node from the cloud infrastructure.

The node 202 issues a request to the cloud infrastructure 200 to synchronize with other nodes in the network 103 for changes that occurred after the creation of the applied snapshot. Specifically, this involves determining all transactions that are stored in any node 104 of the blockchain network 103 whose timestamp is later than the timestamp of the snapshot creation. In some specific embodiments, if there are only transactions that occurred later than the timestamp of the snapshot creation that reside in a private ledger, the new node 202 will not be updated with these transactions unless the new node gains permission to access the private ledger. Otherwise, the new node 202 is only updated based on the transactions on the public ledger that occurred after the time of the snapshot creation.

Figure 4:
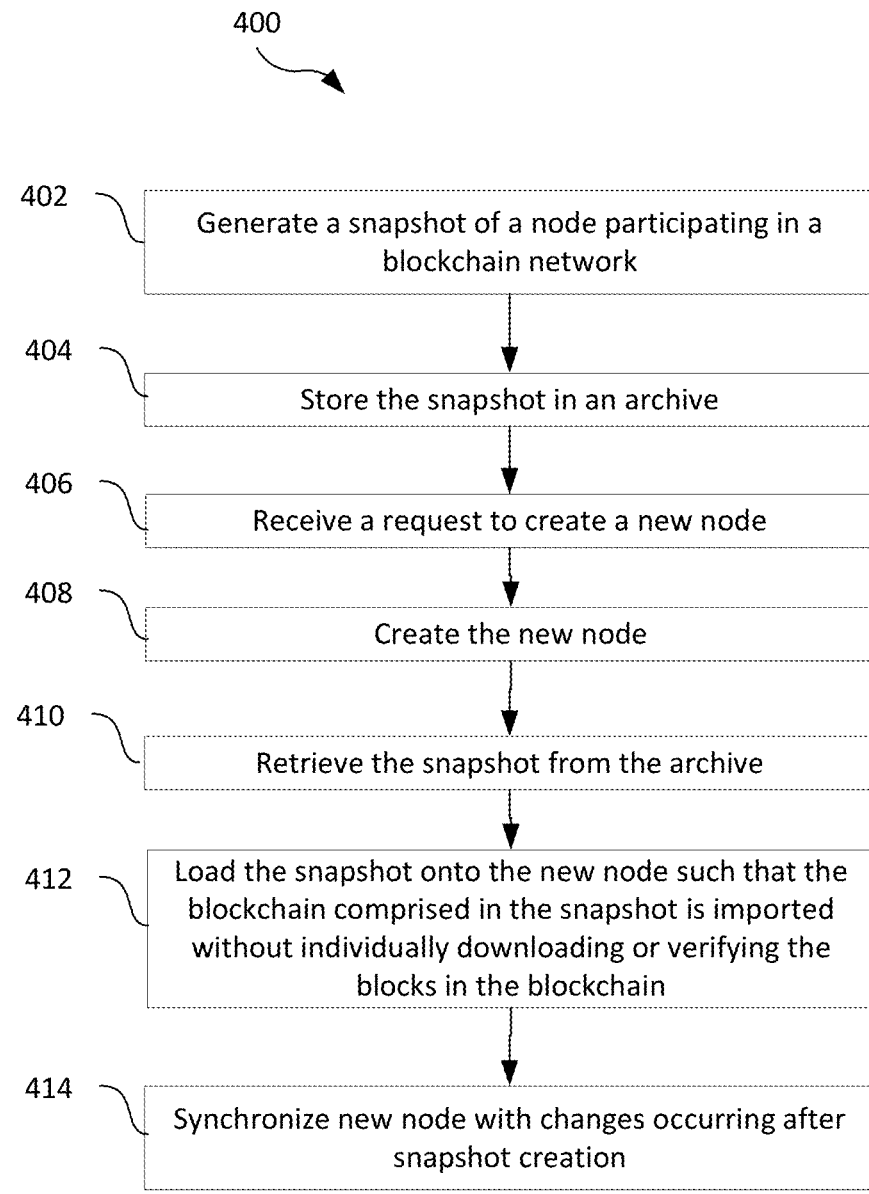
FIG. 4 is a flow diagram illustrating a method of launching new nodes in blockchain network, in accordance with exemplary aspects of the present disclosure.

FIG. 4 is a flowchart illustrating a method 400 of launching new nodes in blockchain network, in accordance with exemplary aspects of the present disclosure.

The method begins at 402 where the chain controller 110 issues a request to generate a backup or snapshot for all unique nodes in the blockchain network, or at least a snapshot of a single node in each of the various ledgers in a blockchain network. The backup and recovery controller 130 creates the snapshots and, at 404, stores the snapshots in an archive.

In exemplary aspects, a unique node refers to a node that has different ledger data depth from other nodes, while the ledger itself is the same on each node, e.g., full node vs. archival node in Ethereum. In another exemplary aspect, unique nodes are nodes in a blockchain network that have different ledger data than each other, e.g., Hyperledger Fabric or R3 Corda nodes containing private ledger data.

In one aspect, a full node stores all blockchain data available on disk and can serve the blockchain network with any data on request. In full mode, the conventional synchronization is performed as discussed previously. In one aspect, an archival node refers to a full node that also builds an archive of historical states—making its storage significantly larger. In one aspect, a light node stores the header chain and requests everything else on demand. A light node may verify the validity of the data against the state roots in the block headers. In one aspect, in fast mode, a node is synchronized by downloading the entire state database, requesting the headers first, and filling in block bodies and receipts afterward.

In some aspects, synchronization may be performed with or without pruning (i.e., reducing storage requirements by enabling deletion of old blocks). In some aspects, synchronization may be performed with or without maintaining a full transaction index.

For each of the different types of modes and synchronization methods, the chain controller 110 issues snapshot generation requests. For example, if a light node exists in the blockchain network, a snapshot of the light node is generated. Likewise, if a full node exists in the blockchain network, a snapshot of the full node is generated.

At 406, the chain controller 110 may receive a request to create a new node to participate in the blockchain network, from a client, another server, or the like. The request may be in any form recognizable by the chain controller 110. In some aspects, the request may also indicate a mode assigned to the new node (e.g., archival sync mode).

At 408, the chain controller 110 issues a request to create the new node using cloud infrastructure hosting the blockchain network. In some aspects, the chain controller 110 may also determine whether the new node should have access to a private ledger prior to creation.

At 410, the chain controller 110 retrieves the generated snapshot of 402. In an exemplary aspect, the generated snapshot matches the node sync mode assigned to the new node. In some aspects, if the new node does have access to the private ledger, the chain controller performs a lookup for the correct snapshot in the archive. The new node is created using the retrieved correct snapshot. In some aspects, the chain controller 110 retrieves a most recently created snapshot of a node in the blockchain network by issuing a request to the backup and recovery controller 130, based on the current time indicated in the new node request, or in some aspects, the time the new node request is received at the chain controller 110. In some aspects, a label is given to each snapshot, per cloud and per region, and the chain controller 110 identifies the most recent snapshot based on a search of the labels in the archive.

At 412, the chain controller 110 loads the snapshot onto the new node such that the blockchain comprised in the snapshot is imported without individually downloading and verifying the blocks of the blockchain. As discussed previously, in a conventional initial synchronization, the new node receives the blockchain directly from the nodes of the blockchain network and must verify each block and transaction to ensure that the blockchain is valid. While the downloading of the blockchain may not take a significant amount of time (depending on the size of the blockchain), the verification process is time consuming and demands high processing power. At 412, the snapshot being loaded onto the new node is of a preexisting node and the blockchain may already be verified (in a manner, the preexisting nodes' data is being duplicated) by the blockchain network. As a result, the snapshot can be loaded onto the new node without the new node needing to re-verify each block/transaction.

Finally, at 414, the new node is synchronized with changes that occurred after a timestamp of the creation of the snapshot.

Figure 5:
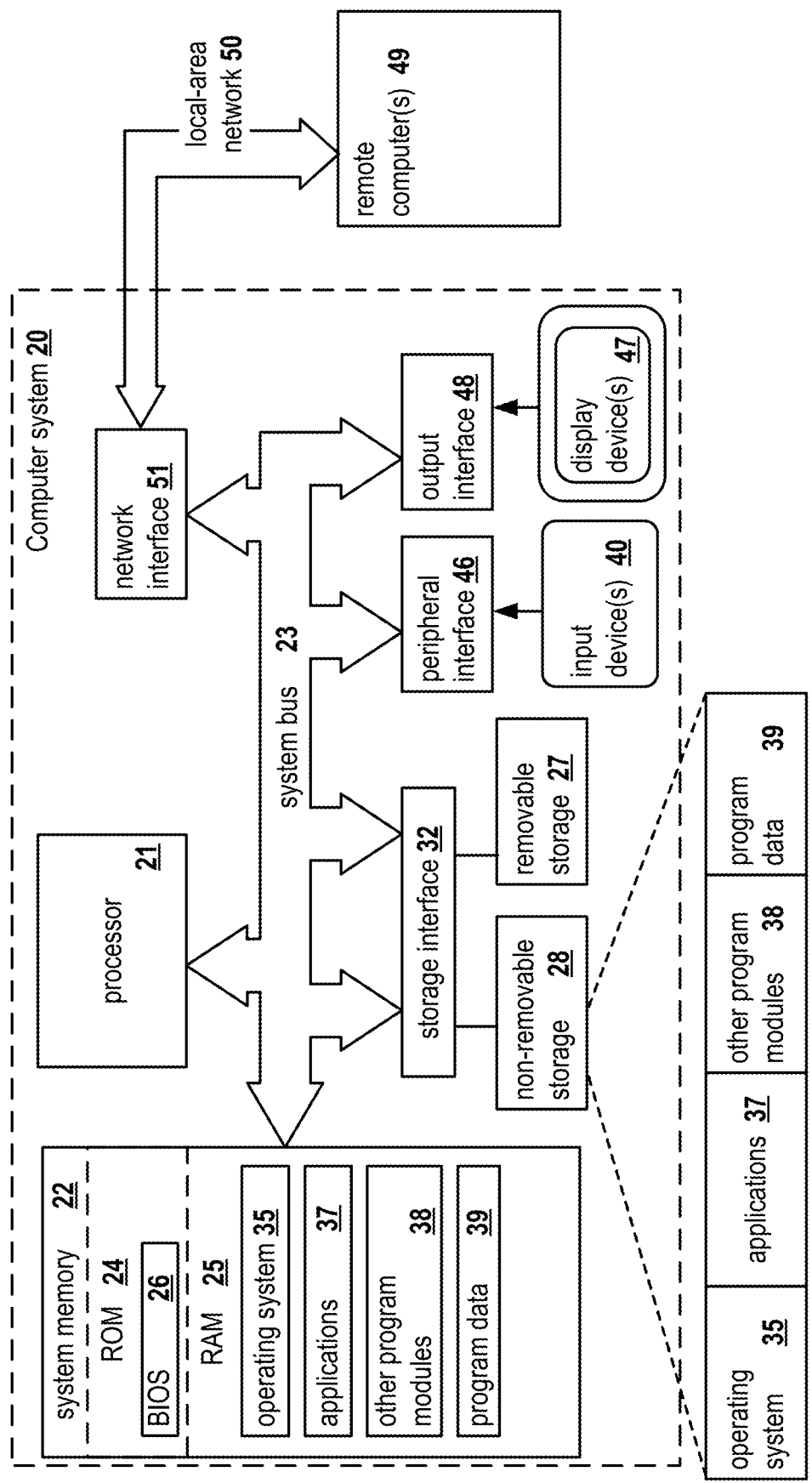
FIG. 5 is a block diagram of a computer system on which the disclosed system and method can be implemented according to an exemplary aspect.

FIG. 5 is a block diagram illustrating a computer system 20 on which aspects of systems and methods of launching new nodes in a blockchain network may be implemented in accordance with an exemplary aspect. It should be noted that the computer system 20 can correspond to any components of the system 100 described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computer system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method of launching new nodes in a blockchain network, comprising:
   generating a snapshot of a node participating in a blockchain network and storing the snapshot in an archive, wherein the snapshot comprises a blockchain;
   generating a respective snapshot for each respective node participating in the blockchain network;
   comparing the snapshot with each respective snapshot to determine whether the blockchain on the snapshot matches more than a threshold number of blockchains on the respective snapshots; and
   in response to determining that the blockchain on the snapshot matches more than the threshold number of the blockchains on the respective snapshots, selecting the snapshot for loading onto a new node;
   receiving a request to create the new node to participate in the blockchain network;
   retrieving, from the archive, the snapshot of the node in the blockchain network;
   creating the new node and loading the snapshot onto the new node such that the blockchain comprised in the snapshot is imported without individually downloading or verifying blocks in the blockchain; and
   synchronizing the new node with changes that occurred on the blockchain subsequent to the generation of the snapshot.

2. The method of claim 1, further comprising:
   generating a plurality of snapshots of nodes participating in the blockchain network, wherein each snapshot of the plurality of snapshots is associated with a respective node sync mode;
   determining a node sync mode of the new node; and
   selecting the snapshot for loading onto the new node in response to determining that the respective node sync mode of the snapshot matches the node sync mode of the new node.

3. The method of claim 1, wherein the blockchain network further comprises a private ledger and wherein the snapshot is a first snapshot, further comprising:
   determining whether the new node has permission to access the private ledger;
   in response to determining that the new node has permission to access the private ledger, retrieving a second snapshot of a node on the blockchain network with access to the private ledger; and
   loading the second snapshot onto the new node.

4. The method of claim 1, further comprising:
   determining a first hash value of the snapshot at a time of generating the snapshot;
   storing the first hash value in the archive;
   prior to loading the snapshot onto the new node, determining a second hash value of the snapshot;
   in response to determining that the first hash value in archive and the second hash value match, loading the snapshot onto the new node.

5. The method of claim 4, further comprising selecting a different snapshot to load onto the new node in response to determining that the first hash value in archive and the second hash value do not match.

6. The method of claim 1, further comprising identifying, in the archive, a most recently created snapshot as the snapshot to load onto the new node.

7. A system of launching new nodes in a blockchain network, the system comprising:
a hardware processor configured to:
generate a snapshot of a node participating in a blockchain network and storing the snapshot in an archive, wherein the snapshot comprises a blockchain;
generate a respective snapshot for each respective node participating in the blockchain network;
compare the snapshot with each respective snapshot to determine whether the blockchain on the snapshot matches more than a threshold number of blockchains on the respective snapshots; and
in response to determining that the blockchain on the snapshot matches more than the threshold number of the blockchains on the respective snapshots, select the snapshot for loading onto a new node;
receive a request to create the new node to participate in the blockchain network;
retrieve, from the archive, the snapshot of the node in the blockchain network;
create the new node and loading the snapshot onto the new node such that the blockchain comprised in the snapshot is imported without individually downloading or verifying blocks in the blockchain; and
synchronize the new node with changes that occurred on the blockchain subsequent to the generation of the snapshot.

8. The system of claim 7, wherein the hardware processor is further configured to:
generate a plurality of snapshots of nodes participating in the blockchain network, wherein each snapshot of the plurality of snapshots is associated with a respective node sync mode;
determine a node sync mode of the new node; and
select the snapshot for loading onto the new node in response to determining that the respective node sync mode of the snapshot matches the node sync mode of the new node.

9. The system of claim 7, wherein the blockchain network further comprises a private ledger and wherein the snapshot is a first snapshot, and wherein the hardware processor is further configured to:
determine whether the new node has permission to access the private ledger;
in response to determining that the new node has permission to access the private ledger, retrieve a second snapshot of a node on the blockchain network with access to the private ledger; and
load the second snapshot onto the new node.

10. The system of claim 7, wherein the hardware processor is further configured to:
determine a first hash value of the snapshot at a time of generating the snapshot;
store the first hash value in the archive;
prior to loading the snapshot onto the new node, determine a second hash value of the snapshot;
in response to determining that the first hash value in archive and the second hash value match, load the snapshot onto the new node.

11. The system of claim 10, wherein the hardware processor is further configured to select a different snapshot to load onto the new node in response to determining that the first hash value in archive and the second hash value do not match.

12. The system of claim 7, wherein the hardware processor is further configured to identify, in the archive, a most recently created snapshot as the snapshot to load onto the new node.

13. A non-transitory computer readable medium storing thereon computer executable instructions for launching new nodes in a blockchain network, including instructions for:
generating a snapshot of a node participating in a blockchain network and storing the snapshot in an archive, wherein the snapshot comprises a blockchain;
generating a respective snapshot for each respective node participating in the blockchain network;
comparing the snapshot with each respective snapshot to determine whether the blockchain on the snapshot matches more than a threshold number of blockchains on the respective snapshots; and
in response to determining that the blockchain on the snapshot matches more than the threshold number of the blockchains on the respective snapshots, selecting the snapshot for loading onto a new node;
receiving a request to create the new node to participate in the blockchain network;
retrieving, from the archive, the snapshot of the node in the blockchain network;
creating the new node and loading the snapshot onto the new node such that the blockchain comprised in the snapshot is imported without individually downloading or verifying blocks in the blockchain; and
synchronizing the new node with changes that occurred on the blockchain subsequent to the generation of the snapshot.

14. The non-transitory computer readable medium of claim 13, further comprising instructions for:
generating a plurality of snapshots of nodes participating in the blockchain network, wherein each snapshot of the plurality of snapshots is associated with a respective node sync mode;
determining a node sync mode of the new node; and
selecting the snapshot for loading onto the new node in response to determining that the respective node sync mode of the snapshot matches the node sync mode of the new node.

15. The non-transitory computer readable medium of claim 13, wherein the blockchain network further comprises a private ledger and wherein the snapshot is a first snapshot, further comprising instructions for:
determining whether the new node has permission to access the private ledger;
in response to determining that the new node has permission to access the private ledger, retrieving a second snapshot of a node on the blockchain network with access to the private ledger; and
loading the second snapshot onto the new node.

16. The non-transitory computer readable medium of claim 13, further comprising instructions for:
determining a first hash value of the snapshot at a time of generating the snapshot;
storing the first hash value in the archive;
prior to loading the snapshot onto the new node, determining a second hash value of the snapshot;
in response to determining that the first hash value in archive and the second hash value match, loading the snapshot onto the new node.

17. The non-transitory computer readable medium of claim 16, further comprising instructions for selecting a different snapshot to load onto the new node in response to determining that the first hash value in archive and the second hash value do not match.

\* \* \* \* \*